United States Patent
Isoda et al.

(10) Patent No.: US 9,136,740 B2
(45) Date of Patent: Sep. 15, 2015

(54) CONTROLLER-INTEGRATED ELECTRIC ROTATING MACHINE

(75) Inventors: Hitoshi Isoda, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 395 days.

(21) Appl. No.: 13/818,003

(22) PCT Filed: Dec. 13, 2010

(86) PCT No.: PCT/JP2010/072351
§ 371 (c)(1),
(2), (4) Date: Feb. 20, 2013

(87) PCT Pub. No.: WO2012/081068
PCT Pub. Date: Jun. 21, 2012

(65) Prior Publication Data
US 2013/0154407 A1 Jun. 20, 2013

(51) Int. Cl.
*H02K 5/22* (2006.01)
*H02K 11/04* (2006.01)

(52) U.S. Cl.
CPC ................ *H02K 5/22* (2013.01); *H02K 11/046* (2013.01); *H02K 11/04* (2013.01)

(58) Field of Classification Search
CPC ....... H02K 5/22; H02K 11/04; H02K 11/044; H02K 11/046; H02K 11/0073
USPC ........................................ 310/68 D, 68 R, 71
See application file for complete search history.

(56) References Cited

U.S. PATENT DOCUMENTS

| | | | | |
|---|---|---|---|---|
| 4,841,182 A * | 6/1989 | Tsuchiya et al. | ............ | 310/68 D |
| 5,682,070 A * | 10/1997 | Adachi et al. | ................... | 310/71 |
| 5,977,669 A * | 11/1999 | Yoshida et al. | ............. | 310/68 D |
| 7,872,383 B2 | 1/2011 | Dubuc et al. | | |
| 7,999,425 B2 * | 8/2011 | Utsumi et al. | ............... | 310/68 D |
| 8,253,287 B2 * | 8/2012 | Isoda et al. | ................... | 310/68 D |
| 2008/0311763 A1 | 12/2008 | Dubuc et al. | | |
| 2010/0133961 A1* | 6/2010 | Shirakata et al. | ........... | 310/68 B |
| 2014/0091682 A1* | 4/2014 | Utsumi et al. | ............... | 310/68 B |

FOREIGN PATENT DOCUMENTS

| | | | |
|---|---|---|---|
| JP | 2002-136039 A | 5/2002 |
| JP | 2007-166822 A | 6/2007 |

(Continued)

*Primary Examiner* — Burton Mullins
(74) *Attorney, Agent, or Firm* — Sughrue Mion, PLLC; Richard C. Turner

(57) ABSTRACT

A controller-integrated electric rotating machine according to the present invention is provided with a heat sink on which a plurality of power modules included in an electric-power conversion circuit are mounted, a power-input/output conductor that is fixed to a bus bar electrically connected with a DC power source and is electrically connected with the DC power source and the bus bar, and a case, made of an insulator, that is fixed to the heat sink and is provided with a terminal that is electrically connected with the bus bar and the plurality of power modules; the bus bar is provided with a single electric connection portion and at least one mechanical connection portion other than the electric connection portion, electrically connected with the terminal by means of the single electric connection portion, and mechanically connected with the heat sink or the bracket through an insulating material by means of the at least one mechanical connection portion.

11 Claims, 8 Drawing Sheets

(56) References Cited

FOREIGN PATENT DOCUMENTS

| | | |
|---|---|---|
| JP | 2008-178247 A | 7/2008 |
| JP | 2008-543261 A | 11/2008 |
| WO | 2006/0129031 A1 | 12/2006 |
| WO | 2008/126214 A1 | 10/2008 |

* cited by examiner

CONTROLLER-INTEGRATED ELECTRIC ROTATING MACHINE

CROSS REFERENCE TO RELATED APPLICATIONS

This application is a National Stage of International Application No. PCT/JP2010/072351 filed Dec. 13, 2010, the contents of all of which are incorporated herein by reference in their entirety.

BACKGROUND OF THE INVENTION

1. Field of the Invention

The present invention relates to a controller-integrated electric rotating machine in which an electric rotating machine and a controller that controls the electric rotating machine are integrated with each other.

2. Description of the Related Art

A controller-integrated electric rotating machine that is mounted in a vehicle such as an automobile is provided with an electric-power conversion circuit that performs electric-power conversion between the armature winding of the electric rotating machine and a battery provided outside the electric rotating machine. In general, the electric-power conversion circuit is provided with a plurality of power modules including a semiconductor switching device and functions as an inverter or a converter, based on control of gate signals applied to the gates of these switching devices. When the electric rotating machine is operated as a motor, the electric-power conversion circuit is operated as an inverter; DC electric power of the battery is inverted into AC power by the inverter and is supplied to the armature winding of the electric rotating machine. In contrast, when the electric rotating machine is operated as an electric power generator, the electric-power conversion circuit is operated as a converter; AC electric power induced across the armature winding of the electric rotating machine is converted into DC power by the converter and is supplied to the battery.

In a controller-integrated electric rotating machine configured as described above, the power input/output terminal of the armature winding of the electric rotating machine and the power input/output terminal, which is an AC terminal of a power module included in an electric-power conversion circuit, are connected through terminals with each other, and the power input/output terminal included in the DC terminals of the power module and the battery terminal are connected through terminals with each other (e.g., refer to Patent Document 1).

PRIOR ART REFERENCE

Patent Document

[Patent Document 1] National Publication of International Patent Application No. 2008-543261

In a conventional vehicle electric rotating machine as disclosed in Patent Document 1, there exist a plurality of electric connection points for inputting electric power to or outputting electric power from a power module including switching devices; therefore, a contact-voltage drop at the electric connection point or a variation in the resistances of the connection points causes differences among electric potentials applied to the power modules, whereby a variation may be caused in the energizing currents that flow in the power modules.

In the foregoing conventional vehicle electric rotating machine, the power input/output terminal is fixed at a single point; therefore, the power input/output terminal is supported in a cantilever manner and hence the strength of a component including the power input/output terminal or a terminal for distributing electric power is reduced; thus, there is posed a problem that the vibration of the power input/output terminal or a harness and the like mounted on the power input/output terminal breaks the power input/output terminal or the terminal for distributing electric power.

SUMMARY OF THE INVENTION

The present invention has been implemented in order to solve the foregoing problems in a conventional electric rotating machine; the objective thereof is to obtain a controller-integrated electric rotating machine in which the difference between the electric potentials applied to power modules included in an electric-power conversion circuit is reduced, a variation in the conduction current is decreased, and the strength of the power input/output terminal, the terminal, and the like are raised.

A controller-integrated electric rotating machine according to the present invention is provided with a stator provided with a stator winding that generates AC electric power or that is supplied with AC electric power, a rotor provided with a rotor magnetic pole that is magnetically coupled with the stator winding, a bracket that is fixed on the stator and pivotably supports the rotor, a plurality of power modules that are connected between the stator winding and an external DC power source and are included in an electric-power conversion circuit that performs electric-power conversion between DC electric power and AC electric power, a heat sink on which the plurality of power modules are mounted and that refrigerates the power modules, a bus bar that is electrically connected with the DC power source, a power-input/output conductor that is fixed to the bus bar and is electrically connected with the DC power source and the bus bar, and a case, made of an insulator, that is fixed to the heat sink and is provided with a terminal that is electrically connected with the bus bar and the plurality of power modules; the controller-integrated electric rotating machine is characterized in that the bus bar is provided with a single electric connection portion and at least one mechanical connection portion other than the electric connection portion, electrically connected with the terminal by means of the single electric connection portion, and mechanically connected with the heat sink through an insulating material by means of at least one mechanical connection portion.

In addition, it should be understood that the present invention is applied also to a case where through the case, the bus bar is mechanically connected with the heat sink by means of the mechanical connection portion.

A controller-integrated electric rotating machine according to the present invention is provided with a stator provided with a stator winding that generates AC electric power or that is supplied with AC electric power, a rotor provided with a rotor magnetic pole that is magnetically coupled with the stator winding, a bracket that is fixed on the stator and pivotably supports the rotor, a plurality of power modules that are connected between the stator winding and an external DC power source and are included in an electric-power conversion circuit that performs electric-power conversion between DC electric power and AC electric power, a heat sink on which the plurality of power modules are mounted and that refrigerates the power modules, a bus bar that is electrically connected with the DC power source and the terminal, a power-input/output conductor that is fixed to the bus bar and is electrically connected with the DC power source and the bus bar, and a case, made of an insulator, that is fixed to the heat sink and is provided with a terminal that is electrically connected with the bus bar and the plurality of power modules; the controller-integrated electric rotating machine is characterized in that the bus bar is provided with a single electric connection portion and at least one mechanical connection portion other than the electric connection portion, electrically connected with the terminal by means of the single electric connection portion, and mechanically connected with the bracket through an insulating material by means of at least one mechanical connection portion.

In a controller-integrated electric rotating machine according to the present invention, the bus bar is provided with a single electric connection portion and at least one mechanical connection portion other than the electric connection portion, electrically connected with the terminal by means of the single electric connection portion, and mechanically connected with the heat sink through an insulating material by means of at least one mechanical connection portion; therefore, because there exists no difference between the electric potentials applied to the plurality of the power modeled, an error in the energizing current can be reduced. The bus bar is mechanically connected with the heat sink by means of the mechanical connection portion other than the electric connection portion; therefore, the load imposed on the electric connection portion can be decreased, whereby the reliability of the electric connection portion can be raised.

In a controller-integrated electric rotating machine according to the present invention, the bus bar is provided with a single electric connection portion and at least one mechanical connection portion other than the electric connection portion, electrically connected with the terminal by means of the single electric connection portion, and mechanically connected with the bracket through an insulating material by means of at least one mechanical connection portion; therefore, because there exists no difference between the electric potentials applied to the plurality of the power modeled, an error in the energizing current can be reduced. The bus bar is mechanically connected with the bracket by means of the mechanical connection portion other than the electric connection portion; therefore, the load imposed on the electric connection portion can be decreased, whereby the reliability of the electric connection portion can be raised; in addition to that, the bus bar, the case, and the heat sink can more robustly be fixed to the bracket.

The foregoing and other object, features, aspects, and advantages of the present invention will become more apparent from the following detailed description of the present invention when taken in conjunction with the accompanying drawings.

DETAILED DESCRIPTION OF THE PREFERRRED EMBODIMENTS

Embodiment 1

Figure 1:
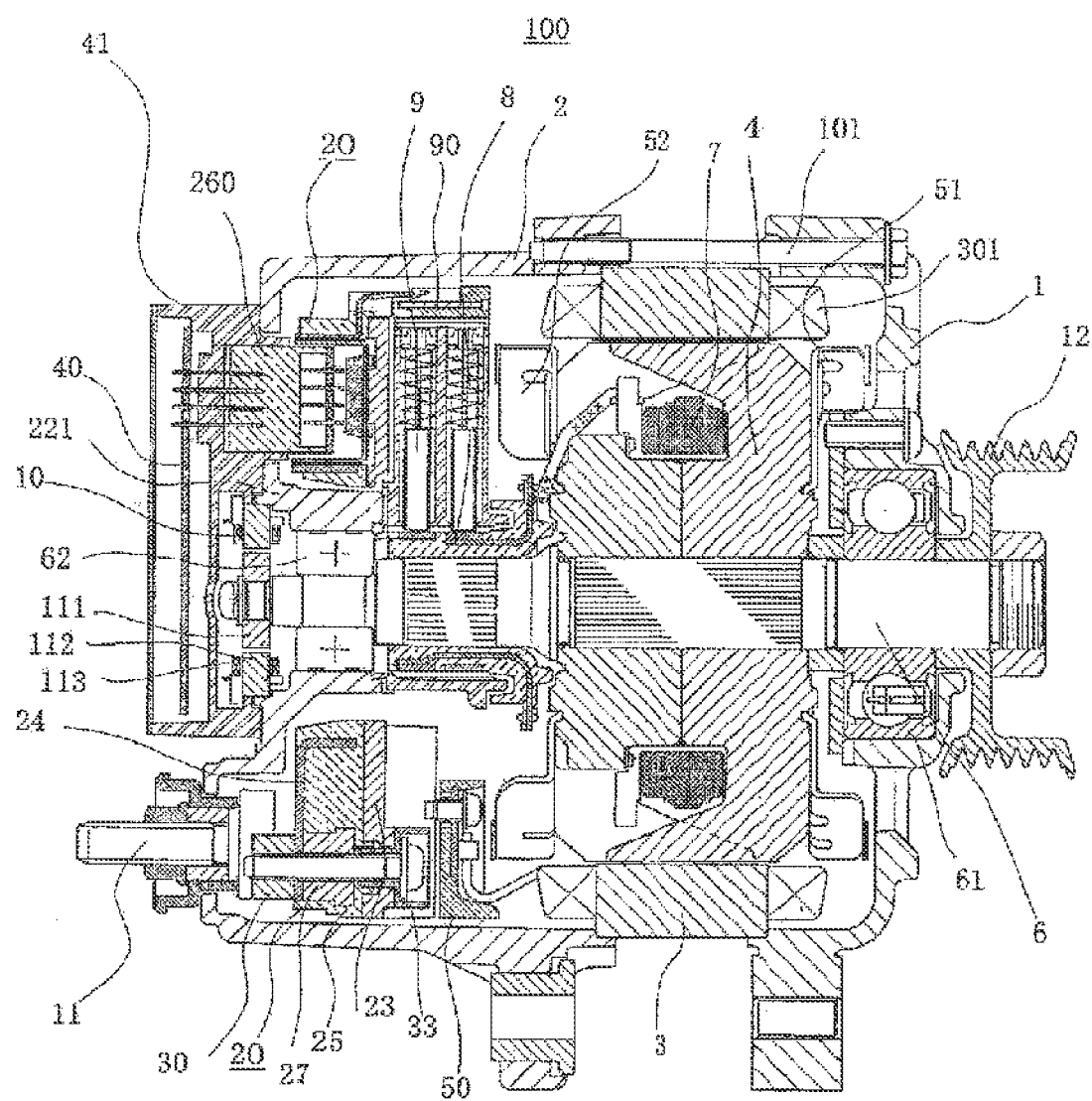
FIG. 1 is a longitudinal cross-sectional view of a controller-integrated electric rotating machine according to Embodiment 1 of the present invention.

FIG. 1 is a longitudinal cross-sectional view of a controller-integrated electric rotating machine according to Embodiment 1 of the present invention. In FIG. 1, a controller-integrated electric rotating machine 100 for a vehicle is provided with a stator iron core 3 supported by a front bracket 1 and a rear bracket 2 and a rotor iron core 4 inserted into the inner space of the stator iron core 3. The rotor iron core 4 is provided with a plurality of rotor magnetic poles that are situated inside the stator iron core 3 and face each other.

A stator winding 301, as an armature winding whose coil chip is inserted into a slot of the stator iron core 3, is fixed on the stator iron core 3. In Embodiment 1, the stator winding 301 is a 6-phase Y-connection winding. A rotor winding 7, as a magnetic-field winding, is fixed on the rotor iron core 4. The stator iron core 3 and the stator winding 301 configure the stator of the electric rotating machine; the rotor iron core 4 and the rotor winding 7 configure the rotor of the electric rotating machine. The front bracket 1 and the rear bracket 2 are tightened with a plurality of bolts in a direction in which the front bracket 1 and the rear bracket 2 approach each other, so that the stator iron core 3 is robustly inserted between the front bracket 1 and the rear bracket 2.

A rotor shaft 6 penetrating the center portion of the rotor iron core 4 is pivotably supported by a front-side bearing 61 supported by the front bracket 1 and a rear-side bearing 62 supported by a center-axis-direction extending portion 221 of the rear bracket 2. A front-side cooling fan 51 and a rear-side cooling fan 52 fixed on the front end face and the rear end face, respectively, of the rotor iron core 4 rotate along with the rotor iron core 4, thereby making air flow from the outside of the electric rotating machine into the inside thereof so as to refrigerate the inside of the electric rotating machine.

A pulley 12 fixed on the front-side end of the rotor shaft 6 is coupled through a belt with a pulley fixed on the output shaft of an unillustrated internal combustion engine. A pair of slip rings 8 fixed on the circumferential surface of the rotor shaft 6 makes contact in a sliding manner with a pair of brushes 9 supported by a brush holder 90 fixed inside the rear bracket 2.

A magnetic pole position detection sensor 10 formed of a synchronized resolver is provided with a sensor rotor 111 fixed on the rear-side end of the rotor shaft 6, a sensor stator 112 that faces the sensor rotor 111 and is fixed on the rear bracket 2, and a sensor winding 113 fixed on the sensor stator 112.

A control-circuit board 40 provided with a control circuit is contained in a circuit-board container 41 made of resin. The control circuit provided in the control-circuit board 40 controls switching operation by an after-mentioned power module 21. The circuit-board container 41 is fixed at the outside face end of the rear bracket 2.

A power circuit unit 20 is fixed in the rear bracket 2 and is provided with an electric-power conversion circuit that performs electric-power conversion between the stator winding 301, which is an armature winding, and an unillustrated battery. The electric-power conversion circuit is configured with six power modules 21, described later, and operates as a 6-phase inverter or a 6-phase converter.

In Embodiment 1, each of the power modules 21 is configured as a single package in which two semiconductor switching devices that are connected in series with each other and two diodes that are connected with respective semiconductor switching devices in an anti-parallel manner are enclosed with a resin. Two semiconductor switching devices enclosed in the power module 21 are connected in series with each other, as described above; one of the two semiconductor switching devices and the diode that are connected with each other in an anti-parallel manner form a positive-polarity arm for one phase out of 6-phase bridge circuit, and the other semiconductor switching device and the diode that are connected with each other in an anti-parallel manner form a negative-polarity arm for the one phase. The connection point at which the two semiconductor switching devices are connected in series with each other is connected with a stator winding for one phase out of the 6-phase stator winding.

Accordingly, each of the six power modules 21 configured as described above has a terminal 22a to be connected with an after-mentioned B terminal 24, a terminal 22b to be connected with an after-mentioned grounding terminal 26a1, and a terminal 22c to be connected with an after-mentioned winding connection terminal 26b.

Figure 2:
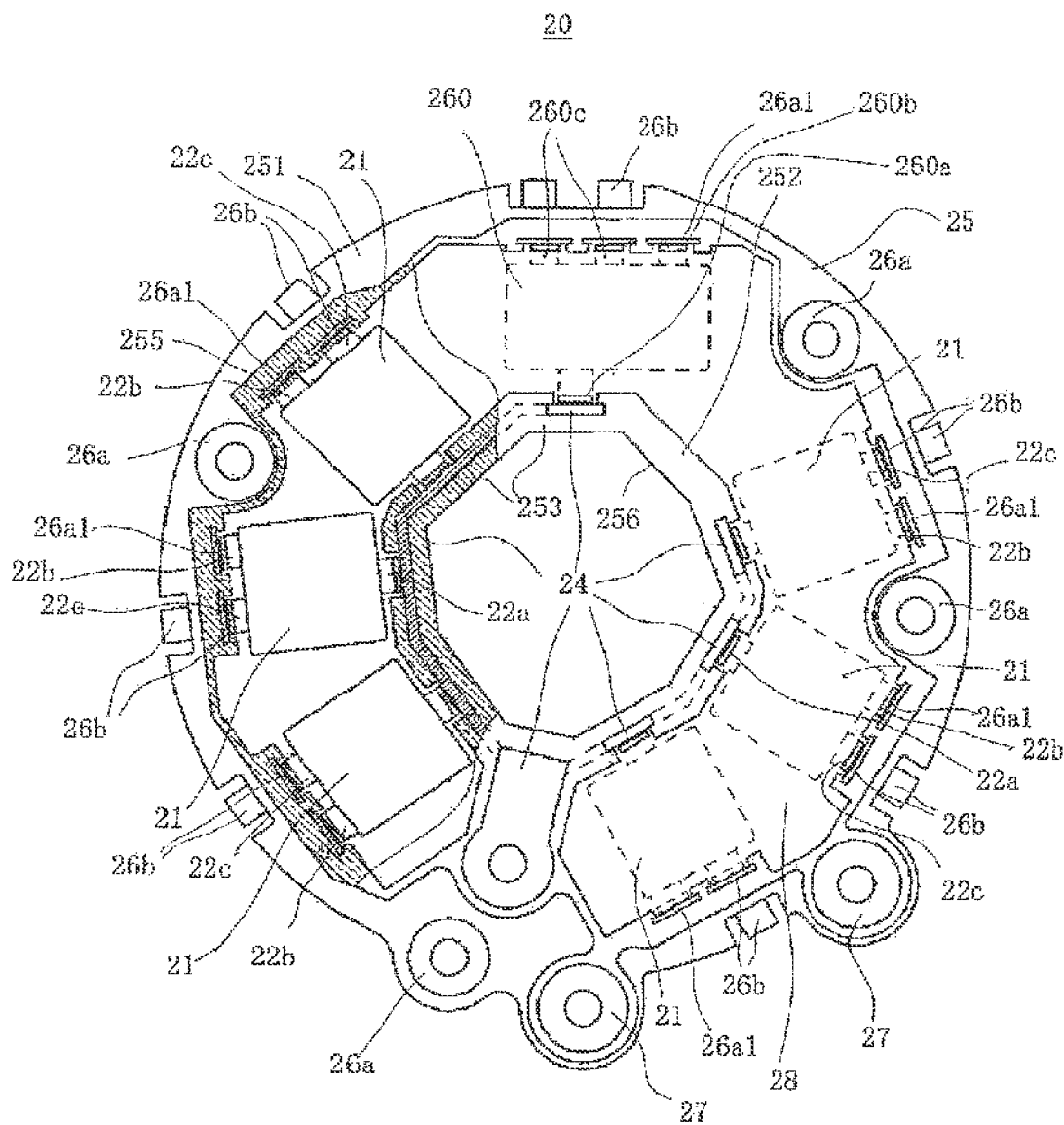
FIG. 2 is a partially cutaway view illustrating the configuration of a power circuit unit of a controller-integrated electric rotating machine according to Embodiment 1 of the present invention.
Figure 3:
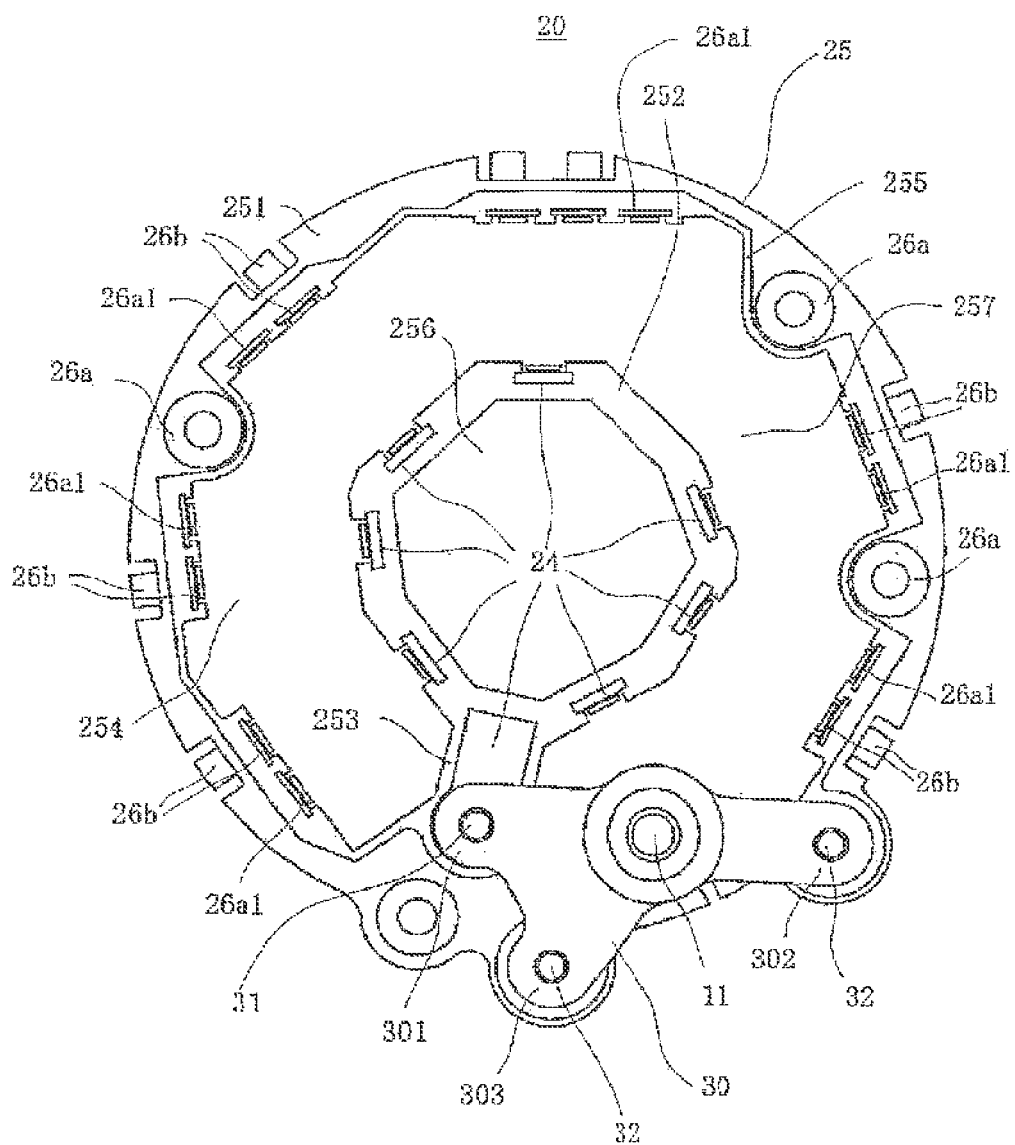
FIG. 3 is a partially cutaway view illustrating the configurations of a power circuit unit and a B bus bar of a controller-integrated electric rotating machine according to Embodiment 1 of the present invention.
Figure 4:
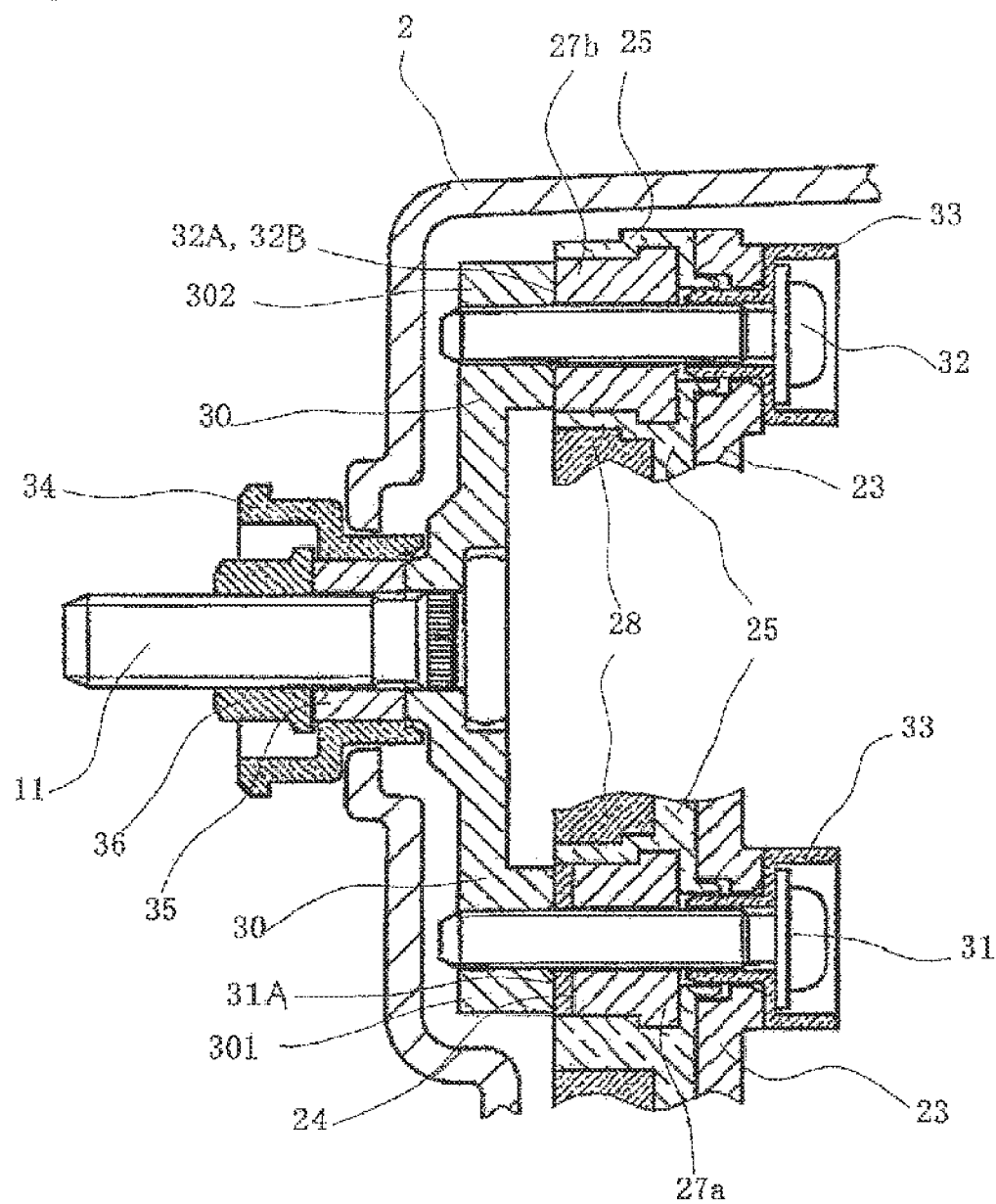
FIG. 4 is a longitudinal cross-sectional view illustrating the principal parts of a power circuit unit and a B bus bar of a controller-integrated electric rotating machine according to Embodiment 1 of the present invention.
Figure 5:
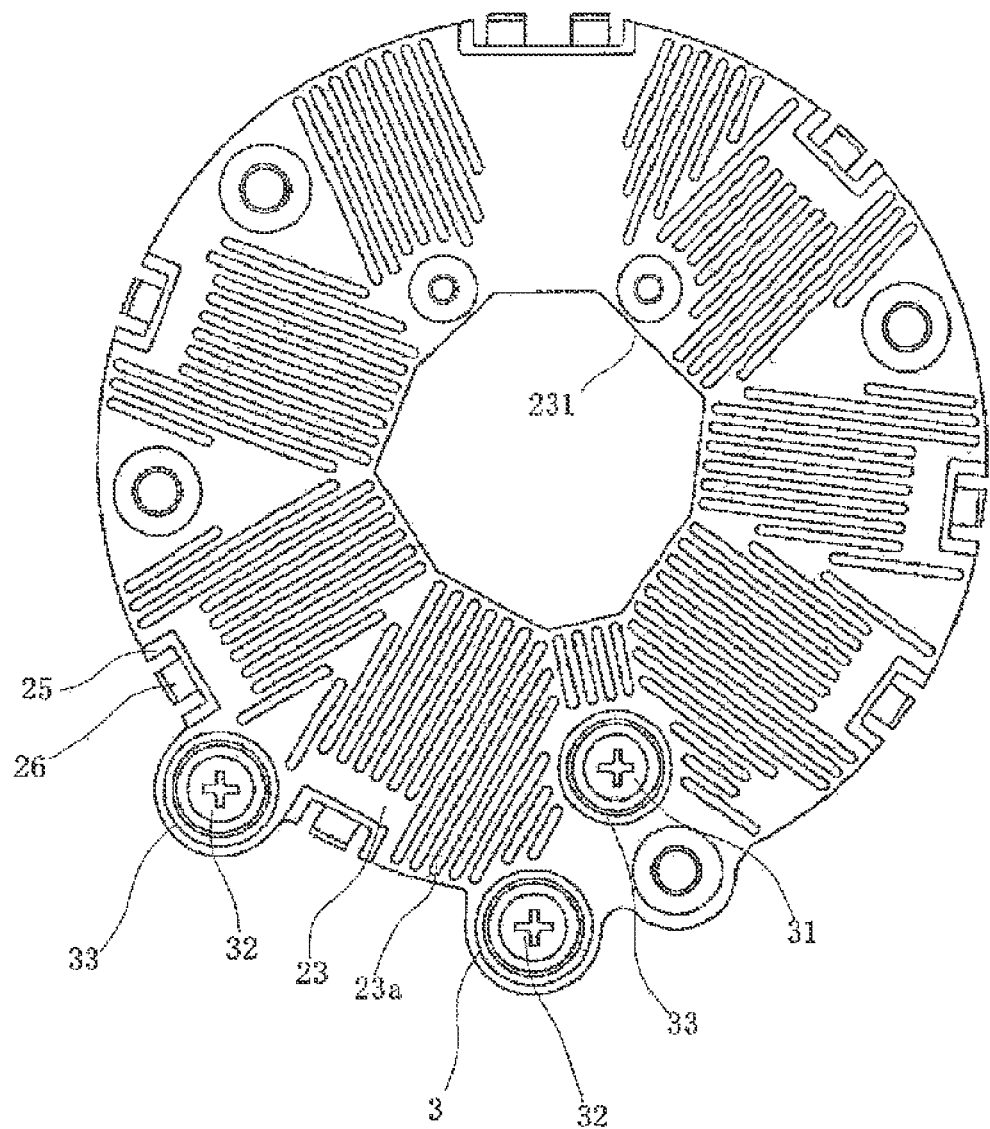
FIG. 5 is a front side view illustrating a power circuit unit and a B bus bar of a controller-integrated electric rotating machine according to Embodiment 1 of the present invention.

Next, the configuration of the power circuit unit 20 will be explained in detail. FIG. 2 is a partially cutaway view illustrating the configuration of a power circuit unit of a controller-integrated electric rotating machine according to Embodiment 1 of the present invention; FIG. 3 is a partially cutaway view illustrating the configurations of a power circuit unit and a B bus bar of a controller-integrated electric rotating machine according to Embodiment 1 of the present invention; FIG. 4 is a longitudinal cross-sectional view illustrating the principal parts of a power circuit unit and a B bus bar of a controller-integrated electric rotating machine according to Embodiment 1 of the present invention; FIG. 5 is a front side view illustrating a power circuit unit and a B bus bar of a controller-integrated electric rotating machine according to Embodiment 1 of the present invention.

In FIGS. 1 through 5, the power circuit unit 20 is provided with six power modules 21 that configure a 6-phase electric-power conversion circuit and control the energization of the stator winding 301; a ring-shaped heat sink 23 on which the power modules 21 are mounted by the intermediary of an insulating layer (unillustrated); the B terminal 24, as a first terminal, electrically connected with the positive terminal of a battery provided outside the controller-integrated electric rotating machine; the grounding terminals 26a and 26a1, as second terminals, connected to the ground potential; the winding connection terminals 26b, as third terminals, for electrically connecting the stator winding 301 with the respective power modules 21; a power-input/output bolt 11, as a power-input/output conductor, electrically connected with the positive terminal of the battery; a B bus bar 30, as a bus bar, that connects the power-input/output bolt 11 with the B terminal 24; and a power circuit case 25.

The ring-shaped heat sink 23 is formed of a metal material such as an aluminum die-cast and is provided with a through-hole at the center portion thereof, as well illustrated in FIG. 5. A great number of cooling fins 23a, which extend in the axis direction toward the stator of the electric rotating machine, are integrally formed on the front surface of the heat sink 23. The rotor shaft 6 and the center-axis-direction extending portion 221 of the rear bracket 2 penetrate the through-hole 231 of the heat sink 23.

The power circuit case 25 is formed of a resin; as well illustrated in FIG. 3, the power circuit case 25 is provided with a ring-shaped external case portion 251, a ring-shaped internal case portion 252, and a case coupling portion 253 that partially couples the external case portion 251 with the internal case portion 252. In the external case portion 251, an external wall 255 that surrounds the through-hole 254 thereof is formed. The external wall 255 forms the external wall of the power circuit case 25. The internal case portion 252 is formed in an axis-direction length that is the same as the axis-direction length of the external wall 255 and is provided with a through-hole 256 having a shape that is the same as the shape of the through-hole 231 of the heat think 23. The internal case portion 252 forms the internal wall of the power circuit case 25.

The power circuit case 25 is fixed on the rear surface of the heat sink 23. As a result, there is formed a power module containing portion 257 that is surrounded by the external case portion 251 and the internal case portion 252 of the power circuit case 25 and the rear surface of the heat sink 23.

As well illustrated in FIG. 2, the six power modules 21 are contained in the power module containing portion 257 and are radially arranged in such a way as to be spaced a gap apart from one another. A control-circuit board connecting portion 260 connected with the control-circuit board 40 is inserted into the power module containing portion 257. The control-circuit board connecting portion 260 is provided for the purpose of supplying gate signals from the control circuit formed in the control-circuit board 40 to the gates of the respective semiconductor switching devices of the power modules 21.

A power circuit waterproofing resin 28 is filled into the power module containing portion 257 containing the power module 21 and the connecting portion 260. As a result, the power module 21 and the connecting portion 260 are embedded in the power circuit waterproofing resin 28 and are waterproofed and protected by the power circuit waterproofing resin 28.

The B terminals 24, as the first terminals, that are connected with the positive terminal of the external battery are molded in the internal case portion 252 of the power circuit case 25 and in the case coupling portion 253; as well illustrated in FIG. 3, the B terminals 24 are exposed at seven points on the external wall face of the internal case portion 252. These exposed B terminals 24 are electrically and mechanically connected through welding or soldering with the respective terminals 22a of the six power modules 21 and a terminal 260a of the control-circuit board connecting portion 260. The B terminals 24 are exposed on the upper surface of the case coupling portion 253 of the power circuit case 25.

As well illustrated in FIG. 2, the grounding terminals, as the second terminals, that are connected to the ground potential include four grounding terminals 26a provided in such a way as to make contact with the external wall 255 of the external case portion 251 of the power circuit case 25 and seven grounding terminals 26a1 that are molded in the external wall 255 and are exposed at the internal wall face of the external wall 255. Six of the seven grounding terminals 26a1 are electrically and mechanically connected through welding or soldering with the respective terminals 22b of the six power modules 21; the other one of the grounding terminals 26a1 is electrically and mechanically connected through welding or soldering with the terminal 260b of the connecting portion 260.

As well illustrated in FIG. 2, the winding connection terminals 26b, as the third terminals, are molded in the external wall 255 of the external case portion 251 of the power circuit case 25; the winding connection terminals 26b are exposed at six positions of the internal wall face of the external wall 255 and exposed at six positions of the external circumferential portion of the external case portion 251 of the power circuit case 25. The winding connection terminals 26b exposed at the six positions of the internal wall face of the external wall 255 are electrically and mechanically connected through welding or soldering with the respective terminals 22c of the six power modules 21; the winding connection terminals 26b exposed at the six positions of the external circumferential portion of the external case portion 251 are connected with the respective windings of the 6-phase stator winding 301 connected with a connecting board 50. The terminals 26b exposed at two positions of the inner side face of the external wall 255 are electrically and mechanically connected through welding or soldering with two respective terminals 260c of the connecting portion 260.

As well illustrated in FIG. 3, a bus bar (referred to as a B bus bar, hereinafter) 30 connected with the positive terminal of the external battery is provided with three vertex portions 301, 302, and 303, corresponding to the vertexes of a triangle, that are fixed supporting portions for the B bus bar 30. These vertex portions 301, 302, and 303 are fixed with screws 31 and 32 to the heat sink 23. The B bus bar 30 is disposed at the opposite side of the heat sink 23 with respect to the power module 21. The B bus bar 30 is formed of an aluminum metal member.

That is to say, as illustrated in FIG. 4, a female screw formed in the vertex portion 301 of the B bus bar 30 screws together with the screw 31 that is inserted therein through an insulating material 33 from the front-side surface of the heat sink 23, so that the vertex portion 301 of the B bus bar 30 is fixed to the heat sink 23 through the insulating material 33, the power circuit case 25, a bush 27a, and the B terminals 24. Similarly, a female screw formed in the vertex portion 302 of the B bus bar 30 screws together with the screw 32 that is inserted therein through an insulating material 33 from the front-side surface of the heat sink 23, so that the vertex portion 302 of the B bus bar 30 is fixed to the heat sink 23 through the insulating material 33, the power circuit case 25, and a bush 27b. Although the vertex portion 303 of the B bus bar 30 is not illustrated in FIG. 4, as is the case with the vertex portion 302, a female screw formed in the vertex portion 303 screws together with the screw 32 that is inserted therein through an insulating material 33 from the front-side surface of the heat sink 23, so that the vertex portion 303 is fixed to the heat sink 23 through the insulating material 33, the power circuit case 25, and the bush 27b. In this situation, the insulating material 33 is inserted between the heat sink 23 and the screw 31 or 32 so that the potential of the heat sink 23 does not become equal to the battery potential.

The bushes 27a and 27b are molded in the power circuit case 25. By inserting the bush 27a or 27b between the power circuit case 25 and the vertex portion 301, 302, or 303 of the B bus bar 30, there is reduced thermal withering, of the resin forming the power circuit case 25, that is caused because the tightening force of the screw 31 or 32 compresses the power circuit case 25 through the bush 27a or 27b and hence the thickness of the power circuit case 25 is decreases.

As described above, the tightening force of the screw 31 presses the B terminal 24 provided in the coupling portion 253 of the power circuit case 25 against the vertex portion 301 of the B bus bar 30, and the B terminals 24 is electrically connected with the B bus bar 30. The B bus bar 30 is electrically connected with the B terminal 24 only at one position of the vertex portion 301 thereof. As described above, the vertex portions 301, 302, or 303 of the B bus bar 30 screws together with the screw 31 or 32, so that the B bus bar 30 is mechanically fixed to and supported by the heat sink 23 through the power circuit case 25 at three positions. The vertex portions 301, 302, and 303 of the B bus bar 30 form the respective vertexes of a triangle.

As well illustrated in FIG. 3, the power-input/output bolt 11 included in the power-input/output conductor is disposed at an approximately center position of one side of the triangle of the B bus bar 30, i.e., the line between the vertex portion 301 and the vertex portion 302, and is fixed to the B bus bar 30. In other word, the power-input/output bolt 11 is disposed in such a way as not to be concentric with the fixed supporting portion of the B bus bar 30; the fixed supporting portion of the B bus bar 30 and the fixed supporting portion, by the B bus bar, of the power-input/output bolt 11 are arranged on an approximately the same plane.

Specifically, as illustrated in FIG. 4, the power-input/output bolt 11 is pressed into a through-hole provided in the B bus bar 30 in such a way that the top portion thereof makes contact with the B bus bar 30, and penetrates a through-hole provided in the rear bracket 2. The power-input/output bolt 11 screws together with a nut 36 provided outside the rear bracket 2 and fixed to the B bus bar 30 and the rear bracket 2 through a bush 35 and a resin insulating material 34. The power-input/output bolt 11 may be disposed inside the vertexes of the triangle formed of the respective vertex portions 301, 302, and 303 of the B bus bar 30.

The grounding terminal 26a1 and 26a1, as the second terminals, make contact with the rear bracket 2, so that the power circuit unit 20 configured as described above is electrically connected with the rear bracket 2, and is fixed to the rear bracket 2 by a bolt (unillustrated). The power circuit case 25 and the heat sink 23 of the power circuit unit 20 are fixed to the inside the rear bracket 2 by means of unillustrated bolts or the like.

In the controller-integrated electric rotating machine 100, configured as described above, according to Embodiment 1 of the present invention, the power-input/output bolt 11 is electrically connected with the positive terminal of the battery provided outside the electric rotating machine, through a battery harness (unillustrated) or the like. The pulley 12 is coupled through a belt with an internal-combustion-engine pulley (unillustrated) provided on the output shaft of an internal combustion engine.

When the controller-integrated electric rotating machine 100 is operated as a motor, the gate signals from the control circuit provided in the control-circuit board 40 perform switching control of the switching devices in the respective power modules 21 in such a way that the electric-power conversion device including the power modules 21 is operated as an inverter. Accordingly, the DC electric power inputted from the battery to the terminal 22a of each of the power modules 21 through the power-input/output bolt 11, the B bus bar 30, and the B terminals 24 is converted into 6-phase AC power by the inverter including the power modules 21 and is supplied to the respective windings of the 6-phase stator winding 301 through the terminal 22b of each of the power modules 21. As a result, the interaction between the rotating magnetic field generated by the stator winding 301 and the magnetic field generated by the magnetic-field winding 7 drives the rotor 4, so that the driving power is transferred from the pulley 12 to the internal combustion engine through a belt.

In contrast, when the controller-integrated electric rotating machine 100 is operated as an electric power generator, the driving power of the internal combustion engine is being transferred to the rotor 4 through the belt, and the gate signals from the control circuit provided in the control-circuit board 40 perform switching control of the switching devices in the respective power modules 21 in such a way that the electric-power conversion device including the power modules 21 is operated as a converter. AC electric power induced across each of the phase windings of the stator winding 301 is applied to each of the power modules 21 through the terminal 22b of the power module 21, converted into DC electric power by the converter including the power modules 21, and is supplied from the terminal 22a of each of the power modules 21 to the battery through the B terminals 24, the B bus bar 30, and the power-input/output bolt 11.

The controller-integrated electric rotating machine 100 according to Embodiment 1 of the present invention is configured as described above; therefore, because the number of electric connection points between the B bus bar 30 and the B terminals 24 is only one, there exists no difference among the electric potentials applied to the respective power modules 21 and hence the error in the energizing current can be reduced. The B bus bar 30 is fixed also at positions other than the electric connection position; therefore, the load on the electric connection position can be reduced, whereby the reliability of the electric connection position can be raised.

Because the power-input/output bolt 11 for electrically connecting and holding the battery harness and the materials with which the battery harness is connected vibrates due to the vibration of the vehicle or the electric rotating machine, the power-input/output bolt 11 imposes a large load on the B bus bar 30; however, by making the fixed supporting portions of the B bus bar 30 correspond to the respective vertexes of a triangle and by disposing the power-input/output bolt 11 on one of the sides of the triangle formed by the fixed supporting portions of the B bus bar 30 or inside the one side, the load on the power-input/output bolt 11 can be separately supported by the respective fixed supporting portions of the B bus bar 30; thus, the stress exerted on the B bus bar 30 can be reduced, whereby the breakage of the B bus bar 30 can be prevented.

The heat sink 23 and the power circuit case 25 are inserted between the B bus bar 30 and the screw 31 or 32; therefore, the B bus bar 30, the heat sink 23, and the power circuit case 25 can be robustly fixed and supported.

Furthermore, the power-input/output bolt 11 is disposed in such a way as not to be concentric with the fixed supporting portion of the B bus bar 30; the fixed supporting portion of the B bus bar 30 and the fixed supporting portion, by the B bus bar, of the power-input/output bolt 11 are arranged on an approximately the same plane. As described above, the fixed supporting portions of the power-input/output bolt 11 and the B bus bar 30 are not arranged so as to be concentric with each other, so that the axis-direction length of the B bus bar can be shortened and hence the axis length of the electric rotating machine can be shortened.

In the case where the power-input/output bolt 11 is disposed in the vicinity of the center of gravity of a polygon formed of the fixed supporting portions of the B bus bar 30, the stress exerted on the B bus bar 30 can further be reduced.

In addition, because the B bus bar 30 is robustly supported at positions corresponding to the vertexes of a triangle, the screw size of the fixation screws 31 or 32 of the B bus bar 30 can be made smaller than that of the power-input/output bolt 11. In Embodiment 1, the screw size of the power-input/output bolt 11 is M8, and the screw size of the screws 31 or 32 is M5; the space of the fixed supporting portion is made small, so that the electric rotating machine is downsized.

In Embodiment 1, the B bus bar 30 is incorporated in the rear bracket 2 and is disposed at a position closer to the rear side of the electric rotating machine than the stator 3 and the rotor 4; the heat sink 23 is disposed at a position closer to the front side of the electric rotating machine than the power module 21, and the B bus bar 30 is disposed at a position slightly closer to the rear side of the electric rotating machine than the power module 21. As described above, in the rear bracket 2, there is provided a hole for leading out the power-input/output bolt 11 that is pressed into the through-hole of the B bus bar 30; the electricity-conducing bush 35 enclosed with the insulating material 34 such as a resin is fixed to the B bus bar 30 with the nut 36. The battery terminal including the power-input/output bolt 11 is situated outside (at the rear side of) the rear bracket 2.

As described above, the rear bracket 2 protects the B bus bar 30 against a flying object from the outside of the electric rotating machine; therefore, the breakage of the B bus bar 30 due to a flying object and the shortcircuit between different-potential positions can be prevented. Even when collision of the vehicle is caused, a shock by a colliding object outside the electric rotating machine is exerted on the rear bracket 2; therefore, the breakage of the B bus bar 30 is prevented, or the contact or the shortcircuit between the B bus bar 30 and the different-potential external object can be prevented, whereby the reliability of the electric rotating machine can be raised.

In Embodiment 1, the fixed supporting portions of the B bus bar 30 are formed in such a way as to correspond to the vertexes of a triangle; however, the fixed supporting portions thereof may correspond to the vertexes of a polygon other than a triangle. In Embodiment 1, the B bus bar 30 is formed of an aluminum metal material; however, the B bus bar 30 may be formed of an Fe-system or Cu-system metal material.

Embodiment 2

Figure 6:
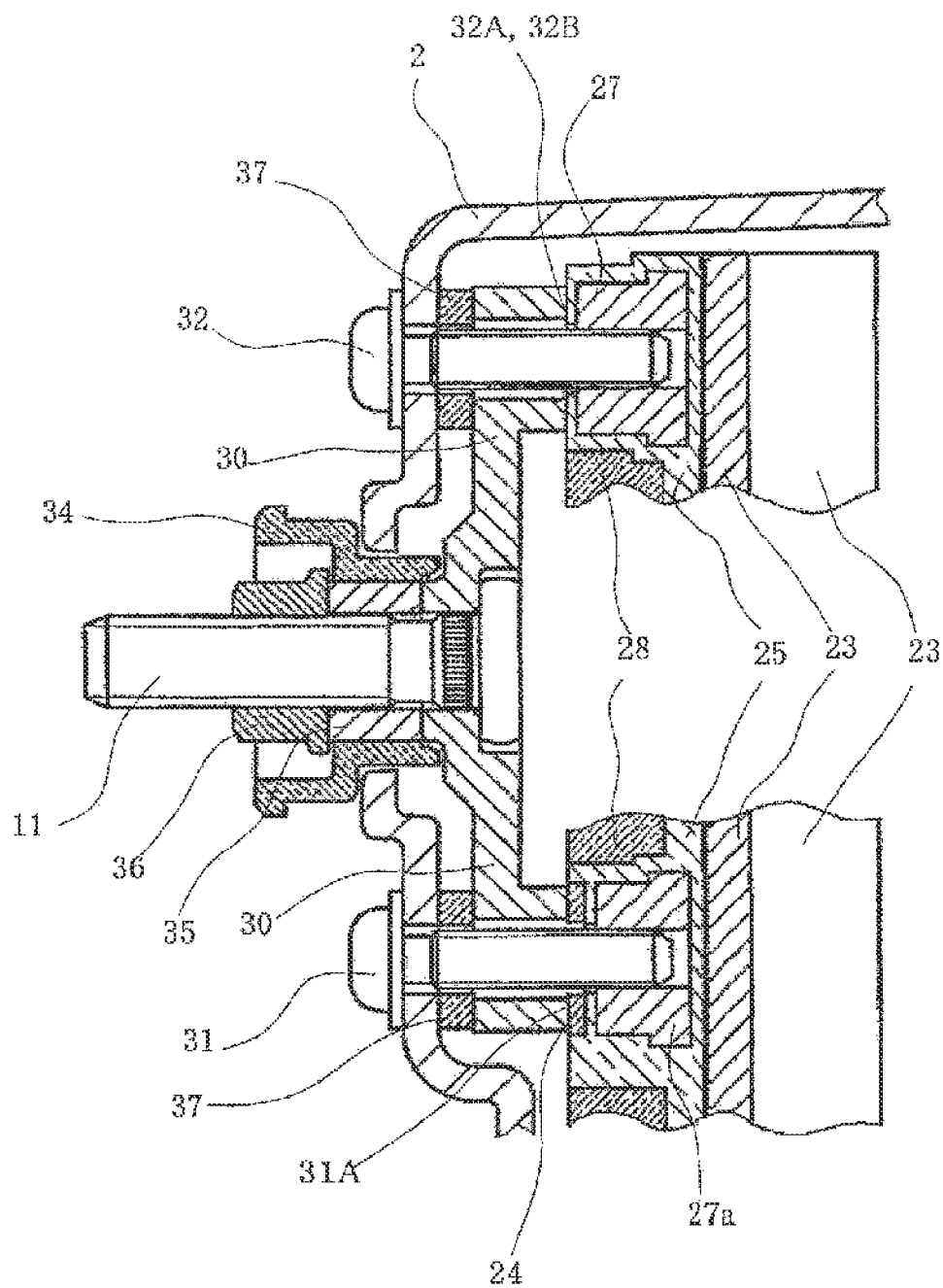
FIG. 6 is a longitudinal cross-sectional view illustrating the principal parts of a power circuit unit and a B bus bar of a controller-integrated electric rotating machine according to Embodiment 2 of the present invention.
Figure 7:
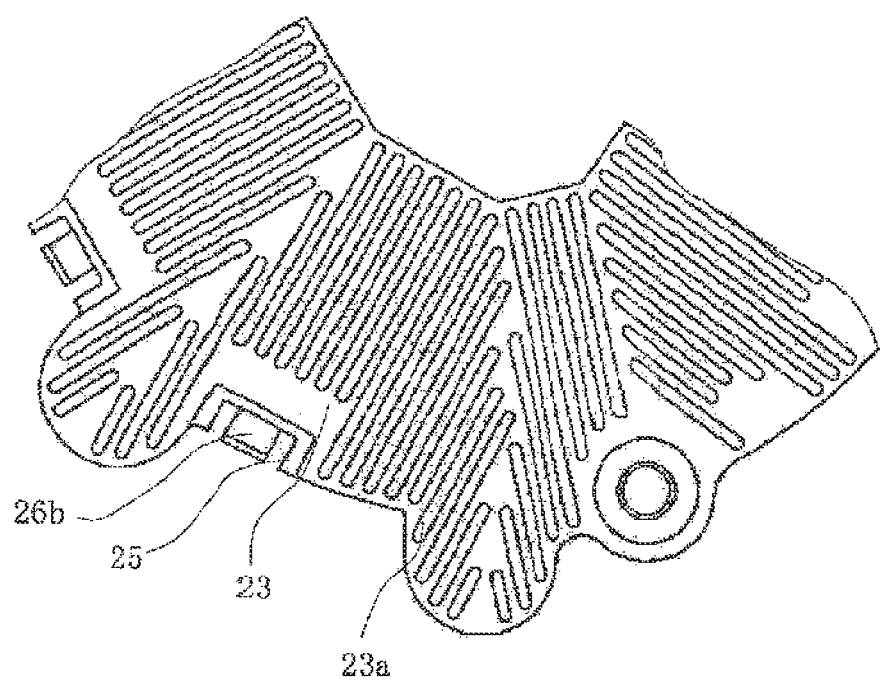
FIG. 7 is a front side view partially illustrating the principal parts of a power circuit unit of a controller-integrated electric rotating machine according to Embodiment 2 of the present invention.

Next, there will be explained a controller-integrated electric rotating machine according to Embodiment 2 of the present invention. FIG. 6 is a longitudinal cross-sectional view illustrating the principal parts of a power circuit unit and a B bus bar of a controller-integrated electric rotating machine according to Embodiment 2 of the present invention; FIG. 7 is a front side view partially illustrating the principal parts of a power circuit unit of a controller-integrated electric rotating machine according to Embodiment 2 of the present invention.

IN FIGS. 6 and 7, as is the case with Embodiment 1, the B bus bar 30 is provided with three vertex portions corresponding to the vertexes of a triangle, and the vertex portions are the fixed supporting portions of the B bus bar 30. The B bus bar 30 is disposed at the opposite side of the heat sink 23 with respect to the power module. The B bus bar 30 is formed of an aluminum metal member. The bushes 27a and 27b in which a screw hole is provided are molded in the power circuit case 25 made of a resin. The power circuit case 25 is electrically connected with the B terminals 24 and is mechanically fixed to and supported by the rear bracket 2, by making the screws 31 and 32, which are inserted from the outside of the rear bracket 2 into the through-holes provided in the rear bracket 2, screw together with the bushes 27a and 27b, respectively.

In other words, the B bus bar 30 is electrically connected with the B terminals 24 of the power circuit case 25 at a single connection point 31A and is fixed by the screw 31 to and supported by the rear bracket 2 through an insulating material 37; in addition, the B bus bar 30 is fixed by the screws 32 to and supported by the rear bracket 2 through the insulating material 37 at two positions 32A and 32B other than the connection point 31A. The B bus bar 30 is incorporated in the rear bracket 2.

Unlike Embodiment 1, the heat sink 23 is not directly involved in fixing and supporting of the B bus bar 30 and hence is not directly coupled with the screws 31 and 32 for fixing and supporting of the B bus bar 30. Accordingly, the heat sink 23 is integrally fixed to the power circuit case 25, and is fixed to the rear bracket 2 through the power circuit case 25. The other configurations are the same as those in Embodiment 1.

In the foregoing controller-integrated electric rotating machine according to Embodiment 2, because the B bus bar 30 is mechanically fixed and held to the rear bracket 2, it is not required that the B bus bar 30 is fixed to and supported by the heat sink 23; therefore, because the space for forming the fins 23a of the heat sink 23 can be increased, the coolability is raised and hence the temperature rise of the power module 21 can be suppressed. Moreover, because the B bus bar 30 can directly be fixed to and supported by the rear bracket 2, the B bus bar 30 can robustly be supported and fixed.

Also in Embodiment 2, as is the case with Embodiment 1, the B bus bar 30 is electrically connected at a single position and is mechanically fixed at two positions in addition to this electric support position. The fixed supporting portions of the B bus bar 30 correspond to the vertexes of a triangle, and the power-input/output bolt 11 is disposed on one of the sides of the triangle or inside the one side.

Also in Embodiment 2, as is the case with Embodiment 1, the rear bracket 2 protects the B bus bar 30 against a flying object from the outside of the electric rotating machine; therefore, the breakage of the B bus bar 30 due to a flying object and the shortcircuit between different-potential positions can be prevented. Even when collision of the vehicle is caused, a shock by a colliding object outside the electric rotating machine is exerted on the rear bracket 2; therefore, the breakage of the B bus bar 30 is prevented, or the contact or the shortcircuit between the B bus bar 30 and the different-potential external object can be prevented, whereby the reliability of the electric rotating machine can be raised.

Embodiment 3

Figure 8:
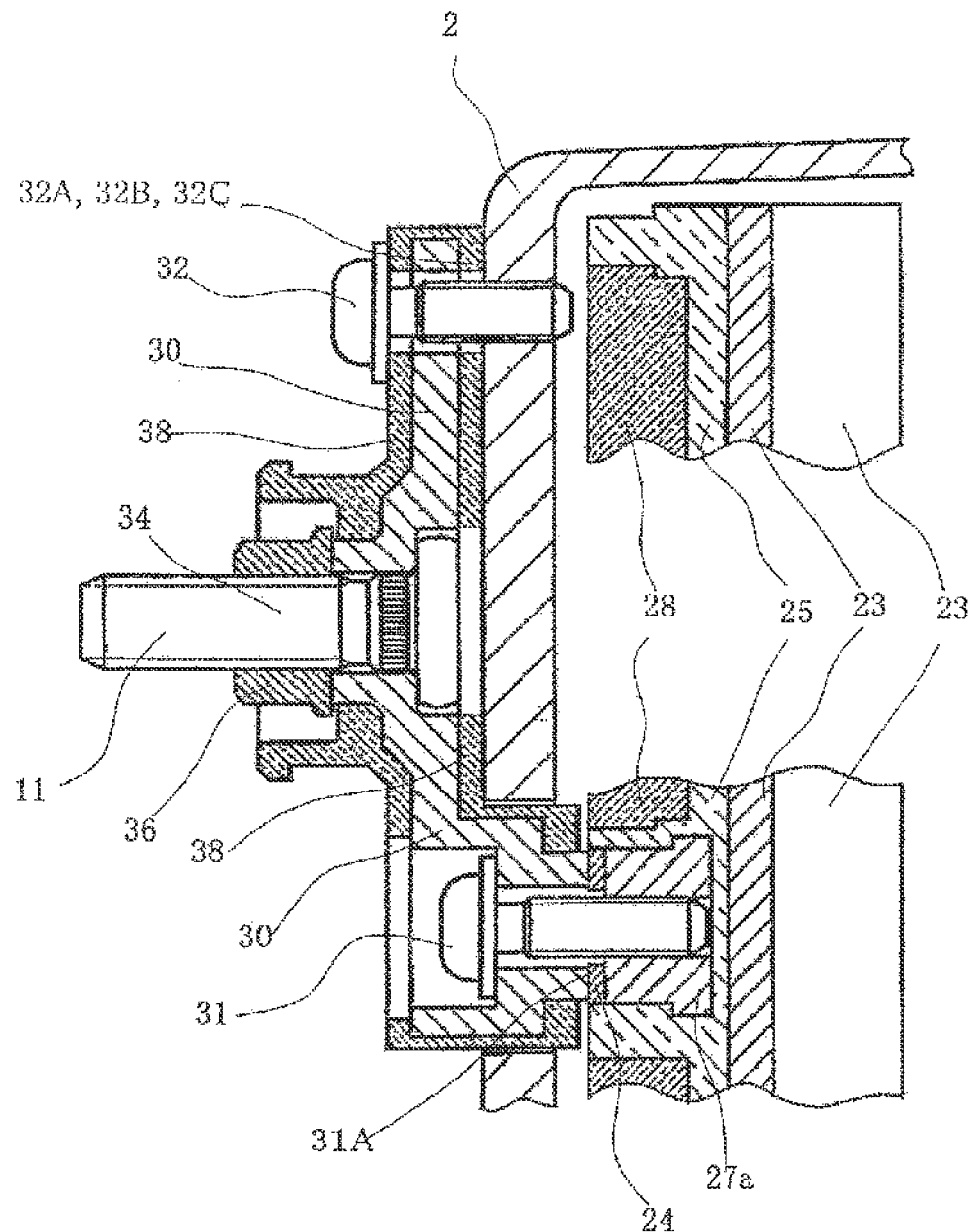
FIG. 8 is a longitudinal cross-sectional view illustrating the principal parts of a power circuit unit and a B bus bar of a controller-integrated electric rotating machine according to Embodiment 3 of the present invention.

Next, there will be explained a controller-integrated electric rotating machine according to Embodiment 3 of the present invention. FIG. 8 is a longitudinal cross-sectional view illustrating the principal parts of a power circuit unit and a B bus bar of a controller-integrated electric rotating machine according to Embodiment 3 of the present invention. In FIG. 8, Embodiment 3 is characterized in that the B bus bar 30 formed of an aluminum metal material is enclosed by a resin 38 so as to be electrically insulated from the rear bracket 2 and is fixed outside the rear bracket 2.

The bush 27a in which a screw hole is provided is molded in the power circuit case 25 made of a resin. The heat sink 23 and the power circuit case 25 are fixed to and supported by the internal face of the rear bracket 2, by use of an unillustrated screws or the like. The screw 31 inserted from the outside of the rear bracket 2 into the through-hole provided in the rear bracket 2 is made to screw together with the bush 27a, so that the B bus bar 30, the power circuit case 25, and the heat sink 23 are mechanically fixed to one another. The B terminal 24 is formed in such a way that part thereof is exposed on the upper surface of the bush 27a; the screw 31 is engaged with the bush 27a in such a way that the foregoing exposed portion makes contact with the B bus bar 30, so that the connection point 31a is formed; at one position on the connection point 31A, the B terminal 24 and the B bus bar 30 are electrically connected with each other.

With three screws 32 (in FIG. 8, only one of them is illustrated), the B bus bar 30 is fixed to and supported by the outside of the rear bracket 2 through an insulating material 38 at three connection positions 32A, 32B, and 32C (in FIG. 8, only the connection position 32A is illustrated), which are spaced apart from one another, other than the foregoing connection position 31A. The other configurations are the same as those in Embodiment 1 or 2.

In Embodiment 3, it is not necessarily required that as is the case with Embodiment 1 or 2, the B bus bar 30 is provided with three vertex portions corresponding to the vertexes of a triangle; the B bus bar 30 may be formed in an arbitrary shape.

In the foregoing controller-integrated electric rotating machine according to Embodiment 3, because the B bus bar 30 is mechanically fixed and held to the rear bracket 2, there can be reduced the positions at which the B bus bar 30 is fixed to and supported by the heat sink 23; therefore, because the space for forming the fins 23a can be increased, the coolability is raised and hence the temperature rise of the power module 21 can be suppressed.

By covering the B bus bar 30 with a resin 37, the shortcircuit between different potentials and the contact or the shortcircuit between the B bus bar 30 and an external object having an electric potential can be prevented.

By disposing the B bus bar 30 outside the rear bracket and fixing the B bus bar 30 with a screw from the outside of the rear bracket 2, it is made possible that after the power circuit unit 20 is mounted in the rear bracket 2, the B bus bar 30 is mounted; thus, the mounting efficiency is raised.

A controller-integrated electric rotating machine according to the present invention can be applied to an electric rotating machine for a vehicle, for example.

Various modifications and alterations of this invention will be apparent to those skilled in the art without departing from the scope and spirit of this invention, and it should be understood that this is not limited to the illustrative embodiments set forth herein.

What is claimed is:

1. A controller-integrated electric rotating machine comprising:
    a stator provided with a stator winding that generates AC electric power or that is supplied with AC electric power;
    a rotor provided with a rotor magnetic pole that is magnetically coupled with the stator winding;
    a bracket that is fixed on the stator and pivotably supports the rotor;
    a plurality of power modules that are connected between the stator winding and an external DC power source and are included in an electric-power conversion circuit that performs electric-power conversion between DC electric power and AC electric power;
    a heat sink on which the plurality of power modules are mounted and that refrigerates the power modules;
    a bus bar that is electrically connected with the DC power source;

a power-input/output conductor that is fixed to the bus bar and is electrically connected with the DC power source and the bus bar; and a case, made of an insulator, that is fixed to the heat sink and is provided with a terminal that is electrically connected with the bus bar and the plurality of power modules, wherein the bus bar is provided with a single electric connection portion and at least one mechanical connection portion other than the electric connection portion, electrically connected with the terminal by means of the single electric connection portion, and mechanically connected with the heat sink through an insulating material by means of at least one mechanical connection portion.

2. The controller-integrated electric rotating machine according to claim 1, wherein the bus bar is provided with at least two mechanical connection portions, and the single electric connection portion and the at least two mechanical connection portions are separately arranged at positions corresponding to the respective vertex portions of a polygon in the bus bar.

3. The controller-integrated electric rotating machine according to claim 2, wherein the power-input/output conductor is fixed on one of the sides of the polygon or inside the respective sides of the polygon in the bus bar.

4. The controller-integrated electric rotating machine according to claim 1, wherein the power-input/output conductor is fixed to the bus bar at a position other than the electric connection portion and the mechanical connection portion of the bus bar.

5. The controller-integrated electric rotating machine according to claim 1, wherein the power-input/output conductor is formed of a bolt; the mechanical connection of the bus bar by means of the mechanical connection portion is performed by a screw; and the screw has a screw diameter that is smaller than that of the bolt.

6. The controller-integrated electric rotating machine according to claim 1, wherein the heat sink on which the plurality of power modules are mounted, the case made of an insulator, and the bus bar are arranged inside the bracket; and the power-input/output conductor fixed to the bus bar penetrates the bracket and is lead out to the outside of the bracket.

7. The controller-integrated electric rotating machine according to claim 1, wherein the heat sink is formed in the shape of a ring, at the center portion of which a through-hole is provided; and the plurality of power modules are radially arranged around the through-hole.

8. The controller-integrated electric rotating machine according to claim 1, wherein the case has a ring-shaped external case portion, a ring-shaped internal case portion disposed inside the external case portion, and a case coupling portion that couples the external case portion with the internal case portion; and the plurality of power modules are radially arranged between the external case portion and the internal case portion.

9. The controller-integrated electric rotating machine according to claim 8, wherein at least part of the terminal is exposed on the surface of the case coupling portion of the case; and the electric connection portion makes contact with the exposed terminal on the surface of the case coupling portion so that the bus bar is electrically connected with the terminal.

10. A controller-integrated electric rotating machine comprising:

a stator provided with a stator winding that generates AC electric power or that is supplied with AC electric power;

a rotor provided with a rotor magnetic pole that is magnetically coupled with the stator winding;

a bracket that is fixed on the stator and pivotably supports the rotor;

a plurality of power modules that are connected between the stator winding and an external DC power source and are included in an electric-power conversion circuit that performs electric-power conversion between DC electric power and AC electric power;

a heat sink on which the plurality of power modules are mounted and that refrigerates the power modules;

a case, made of an insulator, that is fixed to the heat sink and is provided with a terminal that is electrically connected with the plurality of power modules;

a bus bar that is electrically connected with the DC power source and the terminal; and a power-input/output conductor that is fixed to the bus bar and is electrically connected with the DC power source and the bus bar, wherein the bus bar is provided with a single electric connection portion and at least one mechanical connection portion other than the electric connection portion, electrically connected with the terminal by means of the single electric connection portion, and mechanically connected with the bracket through an insulating material by means of at least one mechanical connection portion.

11. The controller-integrated electric rotating machine according to claim 10, wherein the heat sink on which the plurality of power modules are mounted and the case made of an insulator are arranged inside the bracket; and the bus bar is disposed outside the bracket.

* * * * *